United States Patent
Weaver et al.

(10) Patent No.: US 10,160,896 B2
(45) Date of Patent: Dec. 25, 2018

(54) DELAYED-RELEASE ADDITIVES IN A DEGRADABLE MATRIX

(71) Applicant: Halliburton Energy Services, Inc., Houston, TX (US)

(72) Inventors: Jimmie D. Weaver, Duncan, OK (US); Lucas K. Fontenelle, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/563,421

(22) PCT Filed: Apr. 27, 2015

(86) PCT No.: PCT/US2015/027856
§ 371 (c)(1),
(2) Date: Sep. 29, 2017

(87) PCT Pub. No.: WO2016/175752
PCT Pub. Date: Nov. 3, 2016

(65) Prior Publication Data
US 2018/0086961 A1    Mar. 29, 2018

(51) Int. Cl.
*C09K 8/035* (2006.01)
*C09K 8/60* (2006.01)
(Continued)

(52) U.S. Cl.
CPC .............. *C09K 8/035* (2013.01); *C09K 8/602* (2013.01); *C09K 8/605* (2013.01); *C09K 8/88* (2013.01);
(Continued)

(58) Field of Classification Search
CPC . C09K 8/03; C09K 8/035; C09K 8/60; C09K 8/602; C09K 2208/26; E21B 43/25
See application file for complete search history.

(56) References Cited

U.S. PATENT DOCUMENTS 5,164,099 A * 11/1992 Gupta .................... C09K 8/62
166/300
8,519,061 B2   8/2013 Luster-Teasley
(Continued)

FOREIGN PATENT DOCUMENTS

CA   2784990 A1   7/2011
WO   0212674 A1   2/2002
(Continued)

OTHER PUBLICATIONS

International Search Report and Written Opinion date dated Jan. 25, 2016; International PCT Application No. PCT/US2015/027856.

*Primary Examiner* — Zakiya W Bates
*Assistant Examiner* — Crystal J Miller
(74) *Attorney, Agent, or Firm* — McGuireWoods LLP

(57) ABSTRACT

A wellbore treatment fluid comprising: a base fluid; and an extruded substance comprising: a degradable matrix; and an additive, wherein the degradable matrix provides a time-delayed release of the additive into a wellbore fluid for a desired period of time. A method of treating a portion of a well comprising: introducing the treatment fluid into the well; and causing or allowing at least a portion of the degradable matrix to degrade, wherein degradation of the degradable matrix releases at least some of the additive into the wellbore fluid.

19 Claims, 1 Drawing Sheet

(51) Int. Cl.
*E21B 43/25* (2006.01)
*C09K 8/88* (2006.01)
*C09K 8/90* (2006.01)

(52) U.S. Cl.
CPC ............ C09K 8/90 (2013.01); *C09K 2208/20* (2013.01); *C09K 2208/26* (2013.01); *C09K 2208/32* (2013.01); *E21B 43/25* (2013.01)

(56) References Cited

U.S. PATENT DOCUMENTS

| | | |
|---|---|---|
| 2003/0234103 A1 | 12/2003 | Lee et al. |
| 2009/0032252 A1* | 2/2009 | Boney .................... C04B 28/02 166/280.2 |
| 2009/0062157 A1 | 3/2009 | Munoz et al. |
| 2009/0105371 A1* | 4/2009 | Luster-Teasley ....... B09C 1/002 523/124 |
| 2010/0307744 A1 | 12/2010 | Cochet et al. |
| 2014/0338902 A1* | 11/2014 | Mukhopadhyay ...... E21B 43/25 166/279 |

FOREIGN PATENT DOCUMENTS

| | | |
|---|---|---|
| WO | 2003033593 A1 | 4/2003 |
| WO | 2009062136 A2 | 5/2009 |

* cited by examiner

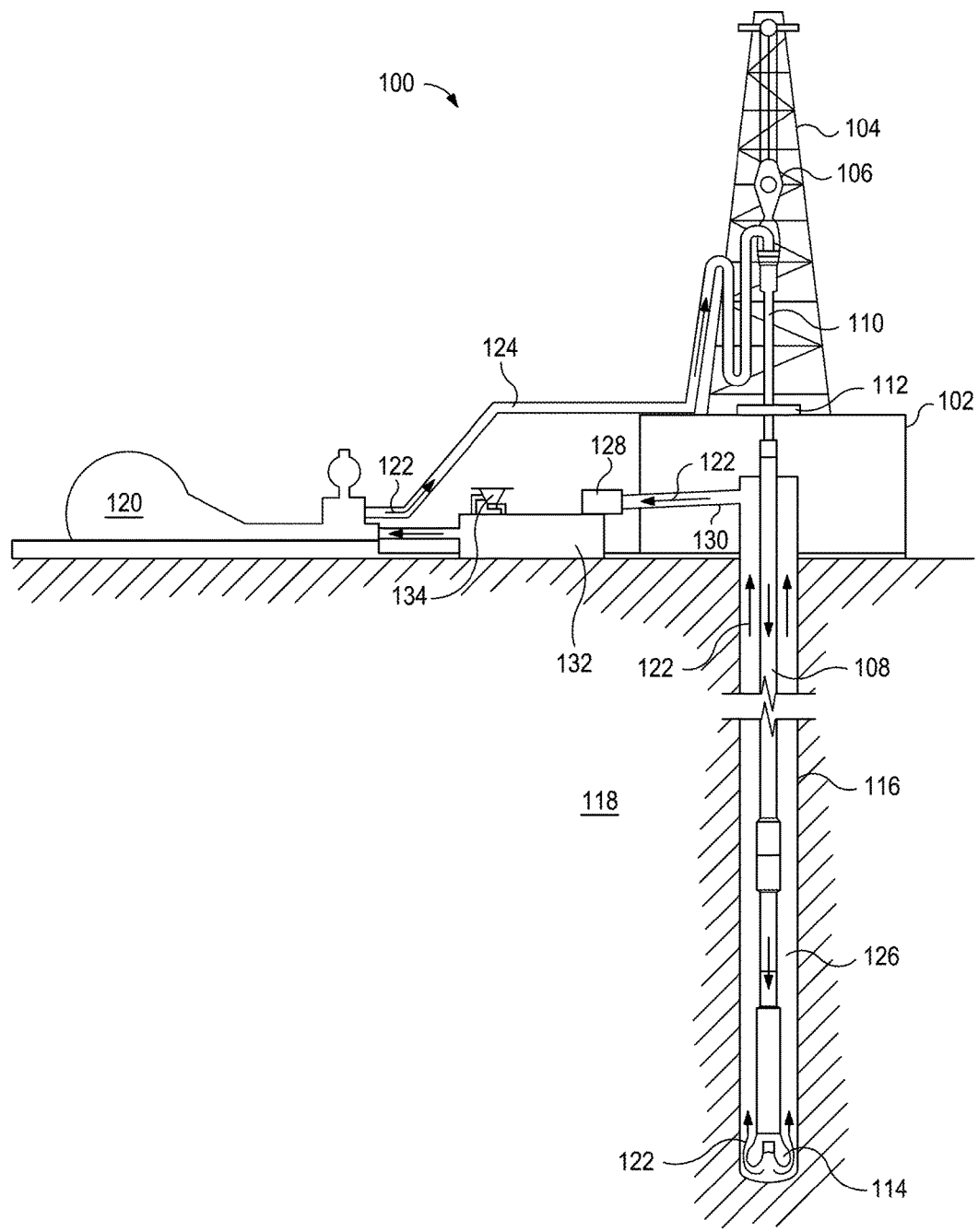

DELAYED-RELEASE ADDITIVES IN A DEGRADABLE MATRIX

TECHNICAL FIELD

Additives can be used in a variety of wellbore operations. The additives can perform a variety of functions including a viscosifier, a cement additive, a fluid loss control additive, and a rheology modifier. The additives can be delayed-release additives such that the additives are released into a portion of a wellbore over an extended period of time.

BRIEF DESCRIPTION OF THE FIGURES

The features and advantages of certain embodiments will be more readily appreciated when considered in conjunction with the accompanying FIGURE. The FIGURE is not to be construed as limiting any of the preferred embodiments.

FIG. 1 illustrates a system for preparation and delivery of a treatment fluid to a wellbore according to certain embodiments.

DETAILED DESCRIPTION

Oil and gas hydrocarbons are naturally occurring in some subterranean formations. In the oil and gas industry, a subterranean formation containing oil or gas is referred to as a reservoir. A reservoir may be located under land or offshore. Reservoirs are typically located in the range of a few hundred feet (shallow reservoirs) to tens of thousands of feet (ultra-deep reservoirs). In order to produce oil or gas, a wellbore is drilled into a reservoir or adjacent to a reservoir. The oil, gas, or water produced from the wellbore is called a reservoir fluid.

As used herein, a "fluid" is a substance having a continuous phase that tends to flow and to conform to the outline of its container when the substance is tested at a temperature of 71° F. (22° C.) and a pressure of 1 atmosphere (atm) (0.1 megapascals (MPa)). A fluid can be a liquid or gas. A homogenous fluid has only one phase, whereas a heterogeneous fluid has more than one distinct phase. A heterogeneous fluid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation, including into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A treatment fluid can be used to treat a portion of a wellbore. Examples of common treatment fluids include, but are not limited to, drilling fluids, spacer fluids, cement compositions, completion fluids, stimulation fluids (e.g., fracturing fluids), and workover fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

Additives, such as corrosion inhibitors, de-emulsifiers, foaming agents, wetting agents, surfactants, scale inhibitors, chelating agents, clay stabilizers, biocides, filter cake breakers, gel breakers, fluid loss control additives, cement set retarders, cement set accelerators, acids, bases, salts, and suspending agents, can be used in a treatment fluid. It is often desirable to delay the release of the additive into wellbore fluids.

One technique to delay the release of additives is to encapsulate the additive with a coating, commonly called encapsulation or microencapsulation. Microencapsulated materials are generally solid additives that are pressed or formed into a solid mass making up a core and then coated with a coating. These coatings are not perfect, and the additive can prematurely leak into the wellbore fluid. The rate of leakage can impact the subsequent rate at which the additive chemically reacts downhole to provide the desired function (e.g., as a surfactant, suspending agent, etc.). Moreover, the coating can often times remain partially or wholly intact, thus causing problems within the well system. A dual coating can be used to minimize or eliminate premature leakage, but crushing then becomes the controlling mechanism for releasing the additive. Another drawback to encapsulation is the additive is generally required to be in a solid form thereby eliminating the ability to use delay-release liquid additives.

There is a continuing need and, thus, ongoing industry-wide interest in new methods for providing delay-release additives for oil and gas operations. It has been discovered that an extrusion process can be used to embed solid or liquid additives within a degradable matrix. One of the advantages to the extrusion process is that a higher concentration of the additive can be included within the matrix compared to encapsulated additives. Another advantage is the amount of delay can be from about 24 hours up to a few years. This amount of delay is in contrast to encapsulated additives that commonly have a delay of a few hours up to possibly a maximum of 24 hours. Yet another advantage is that liquid additives can be used in addition to solid additives.

Extrusion is a process in which an object with a definite cross-sectional profile is created by pushing or pulling a material through a die of the desired cross-section. Extrusion can be performed via a continuous method that creates very long extruded materials or via a batch method that creates discrete segments of extruded materials. Polymers, such as thermoplastics, can be extruded by first melting or softening the polymer and then extruding the melted/softened polymer. The extruded polymer can cool during the extrusion process or cool after the process to form a solidified extruded material.

Thermoplastics are a type of polymer that yield solid materials by heating the polymer to form a polymer melt that can be reshaped and then cooling the polymer melt after reshaping. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer.

As used herein, a "polymer" can include a cross-linked polymer. As used herein, a "cross link" or "cross linking" is a connection between two or more polymer molecules. A cross link between two or more polymer molecules can be formed by a direct interaction between the polymer molecules, or conventionally by using a cross-linking agent that reacts with the polymer molecules to link the polymer molecules together. A second polymer molecule can also be grafted onto the backbone of a first polymer molecule.

According to certain embodiments, a wellbore treatment fluid comprises: a base fluid; and an extruded substance comprising: a degradable matrix; and an additive, wherein the degradable matrix provides a time-delayed release of the additive into a wellbore fluid for a desired period of time.

According to other embodiments, a method of treating a portion of a well comprises: introducing the treatment fluid into the well; and causing or allowing at least a portion of the degradable matrix to degrade, wherein degradation of the degradable matrix releases at least some of the additive into the wellbore fluid.

The discussion of preferred embodiments regarding the treatment fluid or any ingredient in the treatment fluid is intended to apply to all of the composition and method embodiments. Any reference to the unit "gallons" means U.S. gallons.

The treatment fluid can be a homogenous fluid or a heterogeneous fluid. The treatment fluid can include a base fluid. The base fluid can include water. The water can be selected from the group consisting of freshwater, brackish water, seawater, and any combination thereof. The water can be the solvent of the homogeneous fluid or the external or internal phase of the heterogeneous fluid. The treatment fluid can further include a water-soluble salt. The salt can be selected from the group consisting of sodium chloride, calcium chloride, calcium bromide, potassium chloride, potassium bromide, magnesium chloride, sodium bromide, cesium formate, cesium acetate, and any combination thereof. The water-soluble salt can be in a concentration in the range of about 5 to about 25 pounds per barrel (ppb) of the treatment fluid.

The base fluid can also include a hydrocarbon liquid. The hydrocarbon liquid can be selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. Preferably, the saturated hydrocarbon is a paraffin. The paraffin can be an isoalkane (isoparaffin), a linear alkane (paraffin), or a cyclic alkane (cycloparaffin). An example of an alkane is BAROID ALKANE™ base fluid, marketed by Halliburton Energy Services, Inc. Examples of suitable paraffins include, but are not limited to: BIO-BASE 360® (an isoalkane and n-alkane); BIO-BASE 300™ (a linear alkane); BIO-BASE 560® (a blend containing greater than 90% linear alkanes); and ESCAID 110™ (a mineral oil blend of mainly alkanes and cyclic alkanes). The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. Preferably, the unsaturated hydrocarbon is an alkene. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins include ENCORE® drilling fluid and ACCOLADE® drilling fluid, marketed by Halliburton Energy Services, Inc.

The treatment fluid includes a substance. The substance includes a degradable matrix. As used herein, the term "degrade," and all grammatical variations thereof, means to undergo a phase transition, dissolution in a solvent, or chemical decomposition whereby the substance is broken down into smaller fragments or components. As used herein, a "phase transition" means any change that occurs to the physical properties of the substance. As used herein, a "phase transition" can include, without limitation, a change in the phase of the substance (i.e., from a solid to a liquid or semi-liquid, from a liquid or semi-liquid to a gas, etc.), a glass transition, a change in the amount of crystallinity of the substance, physical changes to the amorphous and/or crystalline portions of the substance, and any combinations thereof. A substance will undergo a phase transition at a phase transition temperature. As used herein, a "phase transition temperature" includes a single temperature and a range of temperatures at which the substance undergoes a phase transition. Therefore, it is not necessary to continually specify that the phase transition temperature can be a single temperature or a range of temperatures throughout. By way of example, a substance will have a glass transition temperature or range of temperatures, symbolized as $T_g$. The $T_g$ of a substance is generally lower than its melting temperature $T_m$. The glass transition can occur in the amorphous regions of the substance.

The glass transition, also called the glass-liquid transition, is a reversible transition in one or more regions of a substance from a hard solid into a molten or rubber-like state at the glass transition temperature ($T_g$). Crystallinity refers to the degree of structural order in a solid. A substance can include both amorphous portions or regions and crystalline portions or regions. In these instances, the crystallinity usually means the percentage of the volume of the substance that is crystalline. The crystalline portions of a substance contain atoms or molecules that are arranged in a regular, periodic manner.

The degradable matrix can be a plastic or a hydrogel. According to certain embodiments, the plastic is a thermoplastic or a wax. The degradable matrix can be a polymer. The degradable matrix can be amorphous, crystalline, or combinations thereof in any proportion. The crystallinity (i.e., the volume % of the degradable matrix that is crystalline) can vary and can be pre-selected. For example, the polymerization reaction for a polymeric degradable matrix can be controlled to provide a lower or higher volume % of crystalline regions. The polymer can be a homopolymer or a copolymer. For a copolymer, the repeating units can be random, alternating, periodic, or block. The polymer can be a cross-linked polymer. The polymer can be an aliphatic polyester or a polyanhydride. The polymer can be polysaccharides such as dextran or cellulose; chitin; chitosan; proteins; aliphatic polyesters; poly(lactides); poly(glycolides); poly($\epsilon$-caprolactones); poly(hydroxybutyrates); aliphatic polycarbonates; poly(orthoesters); poly(amides); poly(urethanes); poly(hydroxy ester ethers); poly(anhydrides); aliphatic polycarbonates; poly(amino acids); poly (ethylene oxide); and polyphosphazenes. Suitable examples of thermoplastic polymers include, but are not limited to, polyglycolic acid (PGA), polyvinyl alcohol (PVA), and polylactic acid (PLA). The polymer can also include non-reactive side chains.

The degradable matrix can also be a eutectic, hypo-eutectic, or hyper-eutectic composition. A eutectic composition is a mixture of two or more substances that undergoes a phase transition at a lower temperature than any other composition made up of the same substances. Stated another way, the eutectic composition undergoes the phase transition at a temperature that is lower than the phase transition of at least one of the individual substances making up the composition. The phase transition temperature can be greater than one or more of the individual substances making up the composition, but should be less than at least one of the substances. By way of example, the melting point of bismuth at atmospheric pressure (101 kilopascals) is 520° F. (271° C.) and the melting point of lead is 621° F. (327° C.); however, the melting point of a composition containing 55.5% bismuth and 44.5% lead has a melting point of 244° F. (118° C.). As can be seen the bismuth-lead composition has a much lower melting point than both, elemental bismuth and elemental lead. Not all compositions have a melting point that is lower than all of the individual substances making up the composition. By way of example, a composition of silver and gold has a higher melting point compared to pure silver and pure gold. Therefore, a silver-gold composition cannot be classified as a eutectic composition.

A eutectic composition can also be differentiated from other compositions because it undergoes a phase transition at a single, sharp temperature. Conversely, non-eutectic compositions generally have a range of temperatures at which the composition transitions. There are other compositions that can have both: range of temperatures at which the composition undergoes a phase transition; and a phase transition temperature that is less than at least one of the individual substances making up the composition. These other substances can be called hypo- and hyper-eutectic compositions. A hypo-eutectic composition contains the minor substance (i.e., the substance that is in the lesser concentration) in a smaller amount than in the eutectic composition of the same substances. A hyper-eutectic composition contains the minor substance in a larger amount than in the eutectic composition of the same substances. Generally, with few exceptions, a hypo- and hyper-eutectic composition will have a phase transition temperature higher than the eutectic temperature but less than the phase transition temperature of at least one of the individual substances making up the composition.

The substance also includes an additive. The additive can be a solid or a liquid. The additive can be any additive that is used in oil or gas operations. The additive can be selected from the group consisting of corrosion inhibitors, demulsifiers, foaming agents, wetting agents, surfactants, scale inhibitors, chelants, clay stabilizers, biocides, filter cake breakers, gel breakers, fluid loss additives, cement set retarders, cement set accelerators, suspending agents, acids, bases, salts, and combinations thereof in any proportion. The additive can be in a concentration in the range of about 1% to about 85% by weight of the degradable matrix. The concentration of the additive can also be selected to provide a desired effect after release into a wellbore fluid based on the specific type of additive and the oil or gas operation to be performed and any limitations by wellbore components. One of the advantages to including the additive in an extruded substance is that higher concentrations of the additive can be obtained compared to coated or encapsulated additives. This not only lowers the cost of the additive being used, but also provides a simpler fluid design. According to certain embodiments, the substance is not coated or encapsulated. Accordingly, it is the degradable matrix that provides the desired rate of release of the additive into wellbore fluids instead of using a coating or encapsulation of the additive (including pelletized additives).

The substance can be formed by melting the degradable matrix and intermixing the additive within the melted degradable matrix. The melted composition can then be shaped and cooled. According to other embodiments, the substance can be formed using an extrusion process. The methods can further include creating the extruded substance. The methods can also include obtaining the extruded substance, for example, from a vendor. The extruded substance can be made from extrusion techniques known in the art. The extruded substance can be made via hot extrusion in a continuous method or batch method. According to certain embodiments, the material selected for the degradable matrix can be melted or softened, preferably melted prior to extrusion. The additive, whether in liquid or solid form, can be added to the melted material for the degradable matrix. The additive can then be mixed with the melted material for the degradable matrix. The additive can be intermixed with the melted material for the degradable matrix to form the extruded substance. As used herein, the term "intermixed" means that the entire additive is relatively uniformly distributed throughout the melted material and very few pockets, if any, of the additive exist. Of course more than one type of additive can be added to the melted material. This embodiment can be useful when more than one additive is desired to be used in the well. The additive can be mixed such that a mostly uniform distribution of the additive within the melted material exists. There can also be concentrated areas of additive within the melted material. A liquid additive can chemically interact with the melted material and become incorporated as part of the melted material.

According to certain embodiments, a first extruded substance can be made and additional layers of other types of degradable matrixes and/or other types of additives can be added to create a bi-layer or multi-layered extruded substance. This embodiment can be useful when different degradation rates of the degradable matrix are desired or when different additives are desired to be released into wellbore fluids.

The degradable matrix provides a time-delayed release of the additive into a wellbore fluid for a desired period of time. As such, the substance can be called a delayed-release additive. The release of the additive can be a result of the degradable matrix undergoing a phase transition. By way of example, the degradable matrix can dissolve in wellbore fluids to release the additive included within the matrix. By way of another example, the degradable matrix can melt at the bottomhole temperature of the wellbore, thereby releasing the additive included within the matrix. As used herein, the term "bottomhole" means the portion of the well in which the treatment fluid is introduced. According to certain embodiments, the material making up the degradable matrix is selected such that at least a portion of the degradable matrix degrades at the bottomhole temperature and pressure of the well. By way of example, the degradable matrix can be a eutectic composition that is made from monomer residues that can undergo a phase transition at the bottomhole temperature of the well. According to certain other embodiments, a solvent, heated fluid, or other wellbore fluid for example can be introduced into the well after the treatment fluid to cause at least a portion of the degradable matrix to degrade.

The thermal stability and other properties (e.g., the phase transition temperature and mechanical properties) can be dependent on the monomer residues used to make up the polymer, end groups and/or functional groups of the polymer, and/or the molecular weight of the polymer. For example, differences in the constitution (including molecular weight) and configuration of the polymer molecules are mainly responsible for the fact that the same type of polymer (e.g., polylactic acid) can exist in many grades and possess different properties. Thus, the mere disclosure of the same type of polymer does not mean that that polymer would inherently achieve the same results (e.g., the same phase transition temperature) because of the vast differences between molecular weight and configuration of the same type of polymer as well as end groups and functional groups. By way of example, the addition of non-reactive side chains can be used to adjust the phase transition temperature of the degradable matrix, such as, to decrease the glass-transition temperature ($T_g$) of the degradable matrix. Moreover, the monomer residues and ratios thereof can be adjusted to provide a desired phase transition temperature of the degradable matrix.

The degradable matrix provides a time-delayed release of the additive into a wellbore fluid for a desired period of time. The desired period of time can be at least 24 hours. According to certain other embodiments, the desired period of time can be in the range of 24 hours to several days, months, or even years, for example, up to 2 years. As such, the degradable matrix can begin degrading and thereby start to release the additive into the wellbore fluid. The degradable matrix can continue degrading, which releases the additive for the desired period of time. Accordingly, the majority of or all of the additive is released at the end of the period of time. A mixture of different types of matrix materials can also be used to provide different degradation rates for release of the additive into wellbore fluids. By way of example, the outermost part of the matrix can have a faster degradation rate, whereas the middle and interior portions of the matrix can have slower degradation rates. This can allow an initially faster release of the additive and then a much slower release of the additive over extended periods of time. As stated previously, one of the advantages of the additive being included in an extruded substance is that the time delay can be significantly increased up to months and even years compared to coated or encapsulated additives, which generally are fully released prior to 24 hours. This provides a way to tailor wellbore operations with a single fluid whereby the additive is gradually released over a period of time without the need to repeatedly introduce wellbore fluids containing coated additives into the well.

There are several factors that can be adjusted to control the rate of degradation of the degradable matrix. The chemistry of the polymer making up the degradable matrix, including the monomer residues, the end groups and/or functional groups of the polymer, the relative concentration of the monomer residues, and the molecular weight of the polymer can be selected to provide a degradation rate such that the degradable matrix degrades and releases the additive in the desired period of time.

The porosity of the extruded substance can also be selected to provide a degradation rate such that the degradable matrix degrades and releases the additive in the desired period of time. By way of example, a higher porosity of the extruded substance will generally result in a faster degradation rate. The shape and dimensions of the extruded substance can also be selected such that the degradable matrix degrades and releases the additive in the desired period of time. By way of example, larger dimensions (e.g., length, width, height, and outer diameter or thickness) will generally result in a longer period of time in which the additive is released; whereas, smaller dimensions will generally result in a shorter period of time in which the additive is released. The shape of the extruded substance can also affect the dimensions of the extruded substance. The extruded substance can be spherical-shaped; cubic-shaped; rod-shaped; cone-shaped; ellipse-shaped; cylinder-shaped; curlicue-shaped; plate-shaped; pyramid-shaped; torus-shaped; cross-shaped; lattice-shaped; star-shaped; or any other shape.

More than one type of extruded substance can also be included in the treatment fluid, wherein the different types of extruded substances have different porosities, dimension, shapes, etc. This embodiment can be useful when different periods of time of release of the additive are desired. By way of example, higher porosity extruded substances and lower and/or medium porosity extruded substances can be included in the treatment fluid. The degradation rates are generally inversely related to the porosity of the substances such that the higher the porosity, the shorter the desired period of time. In this manner, an initial concentration of the additive can be released into the wellbore fluid in a first period of time via the higher porosity extruded substances, and additional concentrations of the additive can be released in second, third, fourth, and so on periods of time via the medium and/or low porosity extruded substances. This allows for tailored treatment fluids wherein desired concentrations of the additive are released over desired periods of time.

The methods include introducing the treatment fluid into the well. The treatment fluid can be used in an oil or gas operation, such as for drilling, workover, completion, or stimulation operations. The well can be an oil, gas, or water production well, a geothermal well, or an injection well. The well includes a wellbore. The wellbore penetrates a subterranean formation. The subterranean formation can be part of a reservoir or adjacent to a reservoir. The treatment fluid can be, without limitation, a cement composition, a drilling fluid, a spacer fluid, a workover fluid, or a stimulation fluid.

The treatment fluid can further include one or more additional ingredients or additives selected from cement, a mechanical property enhancer for cement compositions, a friction reducer, a fluid loss additive, a lost-circulation material, a set retarder for cement compositions, a set accelerator for cement compositions, a light-weight additive, and a heavy-weight additive. The additional ingredients can also be made as an extruded substance.

The exemplary fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, as well as other wellbore operations (e.g., completion, injection, workover, and stimulation) without departing from the scope of the disclosure.

The following discussion pertains to the use of the treatment fluid as a drilling fluid, but it should be understood that parts of the discussion can be equally applicable to other types of treatment fluids, such as completion fluids, stimulation fluids, etc. As illustrated, the wellbore assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

One or more of the disclosed fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments, however, the disclosed fluids can be added to the drilling fluid 122 at any other location in the drilling assembly 100. In at least one embodiment, for example, there could be more than one retention pit 132, such as multiple retention pits 132 in series (not shown). Moreover, the retention pit 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128, which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the exemplary fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any measuring while drilling/logging while drilling (MWD/LWD) tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, polycrystalline diamond compact (PDC) bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, any transport vessels, conduits, pipelines, trucks, tubulars, and/or pipes used to fluidically move the fluids from one location to another; any pumps, compressors, or motors used to drive the fluids into motion; any valves or related joints used to regulate the pressure or flow rate of the fluids; and any sensors (i.e., pressure and temperature), gauges, and/or combinations thereof, and the like.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

Example 1

GBW-30 breaker additive was included in a polylactic acid degradable matrix via extrusion. The extruded substance was then added to a treatment fluid and was found not to have any impact on viscosity for 24 hours at 140° F. (60° C.) after which the viscosity began to reduce. The same amount of breaker in a control fluid reduced the viscosity in about 2 hours under the same conditions. This indicates that the extruded substance extended the release of the breaker additive by about 22 hours over the control.

Example 2 sodium chloride additive was included in a polylactic acid degradable matrix via extrusion. The extruded substance was then placed in deionized water, and the chloride ion concentration was monitored over time. There was some chloride released initially due to the process used to prepare the extruded substance, which involved grinding that allowed some sodium chloride to be exposed at the surface of the extruded substance). However, the chloride ion concentration quickly leveled out and remained essentially constant. The temperature was then increased to 180° F. (82° C.) and the chloride ion concentration began to increase at a steady rate for several hours.

Example 3 several surfactant additives were separately included in a polylactic acid degradable matrix via extrusion. The extruded substances were ground to 20/40 mesh size and mixed in a 20/40 mesh proppant pack at a concentration of about 1% by weight of the proppant. Water was flowed through the packs for 24 hours. The effluent was tested for foaming tendency. Samples from the initial flow did foam, but after a few pore volumes were flowed through the pack, the foaming ceased—indicating that the temperature was too low to cause degradation of the degradable matrix. The temperature was increased to 140° F. (60° C.) and the effluent began to foam and continued to do so for several days.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a well comprising:
   introducing a treatment fluid into the well, wherein the treatment fluid comprises:
   (A) a base fluid; and
   (B) a substance comprising:
      (i) a degradable matrix; wherein the degradable matrix is a plastic or a hydrogel; and
      (ii) an additive, wherein the degradable matrix provides a time-delayed release of the additive into a wellbore fluid for a desired period of time;
   wherein the substance is extruded; and
   causing or allowing at least a portion of the degradable matrix to degrade, wherein a solvent, heated fluid, or other wellbore fluid is introduced into the wall after the step of introducing the treatment fluid to cause at least a portion of the degradable matrix to degrade; wherein degradation of the degradable matrix releases at least some of the additive into the wellbore fluid.

2. The method according to claim 1, wherein the base fluid comprises water, a hydrocarbon liquid, or combinations thereof.

3. The method according to claim 1, wherein the plastic is a thermoplastic or a wax.

4. The method according to claim 1, wherein the degradable matrix is a polymer.

5. The method according to claim 1, wherein the polymer is selected from the group consisting of polysaccharides, including dextran or cellulose; chitin; chitosan; proteins; aliphatic polyesters; poly(lactides); poly(glycolides); poly (ε-caprolactones); poly(hydroxybutyrates); aliphatic polycarbonates; poly(orthoesters); poly(amides); poly(urethanes); poly(hydroxy ester ethers); poly(anhydrides); aliphatic polycarbonates; poly(amino acids); poly(ethylene oxide); polyphosphazenes; and combinations thereof.

6. The method according to claim 1, wherein the degradable matrix is a eutectic, hypo-eutectic, or hyper-eutectic composition.

7. The method according to claim 1, wherein the additive is a solid or a liquid.

8. The method according to claim 1, wherein the additive is selected from the group consisting of corrosion inhibitors, demulsifiers, foaming agents, wetting agents, surfactants, scale inhibitors, chelants, clay stabilizers, biocides, filter cake breakers, gel breakers, fluid loss additives, cement set retarders, cement set accelerators, suspending agents, acids, bases, salts, and combinations thereof in any proportion.

9. The method according to claim 1, wherein the additive is in a concentration in the range of about 1% to about 85% by weight of the degradable matrix.

10. The method according to claim 1, wherein more than one type of additive is included in the degradable matrix.

11. The method according to claim 1, wherein the material making up the degradable matrix is selected such that at least a portion of the degradable matrix degrades at the bottom-hole temperature and pressure of the well.

12. The method according to claim 1, wherein the desired period of time is at least 24 hours.

13. The method according to claim 1, wherein the desired period of time is in the range of 24 hours to 2 years.

14. The method according to claim 13, wherein the majority of or all of the additive is released at the end of the period of time.

15. The method according to claim 13, wherein the degradable matrix is a polymer, and wherein the monomer residues, the end groups and/or functional groups of the polymer, the relative concentration of the monomer residues, and the molecular weight of the polymer are selected to provide a degradation rate such that the additive is released in the desired period of time.

16. The method according to claim 13, wherein the porosity of the extruded substance is selected to provide a degradation rate such that the additive is released in the desired period of time.

17. The method according to claim 13, wherein the shape and dimensions of the extruded substance are selected such that the additive is released in the desired period of time.

18. The method according to claim 1, wherein the step of introducing is performed using a pump.

19. The method according to claim 1, wherein the substance is neither coated nor encapsulated.

* * * * *